United States Patent
Meyer (10) Patent No.: US 7,445,443 B2
(45) Date of Patent: Nov. 4, 2008

(54) TURNING BAR DRAW-OFF DEVICE FOR A TUBULAR FILM EXTRUSION INSTALLATION

(75) Inventor: Helmut Meyer, Troisdorf (DE)

(73) Assignee: Reifenhäuser GmbH & Co. Maschinenfabrik, Troisdorf (DE)

(*) Notice: Subject to any disclaimer, the term of this patent is extended or adjusted under 35 U.S.C. 154(b) by 452 days.

(21) Appl. No.: 11/148,971

(22) Filed: Jun. 9, 2005

(65) Prior Publication Data

US 2005/0286994 A1 Dec. 29, 2005

(30) Foreign Application Priority Data

Jun. 9, 2004 (DE) ................. 20 2004 009 242 U
Jul. 6, 2004 (DE) ................. 20 2004 010 548 U (51) Int. Cl.
B29C 53/00 (2006.01)
B29C 53/10 (2006.01)
B29C 53/16 (2006.01)
B29C 53/20 (2006.01)

(52) U.S. Cl. .............. 425/445; 425/66; 425/72.1; 425/325; 425/326.1; 425/377; 425/383; 425/392; 264/176.1; 264/280; 242/615

(58) Field of Classification Search .............. 425/66, 425/392, 383, 445, 72.1, 377, 325, 326.1; 264/176.1, 280; 242/615.2 X
See application file for complete search history.

(56) References Cited

U.S. PATENT DOCUMENTS

| 3,337,107 | A | * | 8/1967 | Catallo et al. | 242/615.21 |
| 3,716,322 | A | * | 2/1973 | Kratzert | 425/392 |
| 5,013,234 | A | * | 5/1991 | Reinhold | 425/327 |
| 5,360,328 | A | * | 11/1994 | Cree et al. | 425/72.1 |
| 5,589,201 | A | | 12/1996 | Tkach et al. | |
| 5,727,723 | A | * | 3/1998 | Cree | 226/118.3 |
| 6,241,502 | B1 | | 6/2001 | Baeumer et al. | |
| 7,201,300 | B2 | * | 4/2007 | Buri et al. | 226/196.1 |

FOREIGN PATENT DOCUMENTS

DE 21 56 079 C2 7/1983

* cited by examiner

*Primary Examiner*—Christina Johnson
*Assistant Examiner*—Magali P Théodore
(74) *Attorney, Agent, or Firm*—Pauley Peterson & Erickson (57) ABSTRACT

A turning bar draw-off device for a tubular film extrusion installation, with a plurality of turning bars which can be rotatingly driven around a common axis of rotation or in reverse by rotary drive mechanisms. For the rotating or reversing guidance of the turning bars around the axis of rotation, the ends of each turning bar are connected with guide carriages, which are guided on guide rails arranged in a circle.

28 Claims, 6 Drawing Sheets

TURNING BAR DRAW-OFF DEVICE FOR A TUBULAR FILM EXTRUSION INSTALLATION

BACKGROUND OF THE INVENTION

1. Field of the Invention

This invention relates to a turning bar draw-off device for a tubular film extrusion installation, with a plurality of turning bars which can be rotatingly driven around a common axis of rotation or in reverse by rotary drive mechanisms.

2. Discussion of Related Art

Turning bar draw-off devices for tubular film extrusion installations are known, for example as taught by German Patent Reference DE 21 56 079 C2. They are used for repeatedly changing the direction of tubular films previously extruded in the tubular film extrusion installation and conveyed to the turning bar draw-off device, and to move them off to a following winding device, wherein the repeated changing of the direction of the tubular film path occurs successively over the turning bars. As a result of the rotary or reversing movements of the turning bars, generated by rotary drive mechanisms, around a common axis of rotation, which customarily coincides with the axis of the supplied tubular film, tolerances in the thickness of the extruded tubular film are evenly distributed over the width thereof in the wound state, to assure a uniform winding result.

While the turning bar draw-off devices known are satisfactory with regard to their functioning, their mechanical structure is extremely elaborate and cost-intensive because of turning bars which must be driven with partially different rotary or reversing speeds, so that this appears to be worthy of improvements.

SUMMARY OF THE INVENTION

It is one object of this invention to simplify the construction of a known turning bar draw-off device, as mentioned above but so that it can be produced more compact and with less costs than the known turning bar draw-off devices.

For attaining this object, a turning bar draw-off device has characteristics described in this specification and in the claims.

For the rotating or reversing guidance of the turning bars around the axis of rotation, this invention provides for ends of each turning bar to be connected with guide carriages, which in turn are guided on guide rails arranged in a circle. Sliding, as well as rolling guide devices can be considered.

With the design in accordance with this invention, it is possible to overcome the elaborate and cost-intensive construction with a plurality of known rotating bearings for the rotatable seating of the individual turning bars drivable rotatingly or in reverse, wherein an extremely compact and stable construction is achieved.

The guide rails and guide carriages employed for the rotating or reversing guidance of the turning bar can be derived from known linear guidance systems, with straight guide rails and guide carriages correspondingly guided thereon, provided the guide rails have an appropriate circular course for the rotating or reversing guidance of the turning bars.

So that a jerk-free and tilt-free guidance of the turning bars, which can possibly have a considerable weight, is possible, the guide rails preferably have guide grooves along both their circular inside and outside, wherein the guide carriages have a correspondingly undercut sliding groove, with which they are guided in the guide grooves of the guide rails.

Thus it is possible to guide the guide carriages with flat gliding surfaces along the guide grooves of the guide rails, or to equip the guide carriages with rolling bodies that roll off onto the guide grooves of the guide rails.

Also, for creating a particularly compact turning bar draw-off device, this invention guides the guide carriages of several turning bars on a common guide rail. For example, with a turning bar draw-off device with a total of four turning bars, which can be driven rotatingly or in reverse, it is possible to respectively guide the guide carriages of two of these turning bars on their own guide rails, while the corresponding guide carriages of two further turning bars are guided on a common further guide rail, so that only three guide rails are needed as a whole for the four turning bars, which are drivable rotatingly or in reverse and which must be correspondingly guided, which favors a particularly compact construction of the turning bar draw-off device and also provides definite cost advantages because of the savings of a further guide rail.

The guide carriages assigned to a turning bar are preferably rigidly connected with each other by a cross arm. Depending on whether it is assigned to a turning bar driven rotatingly or in reverse, and/or whether it is arranged alone on a guide rail assigned to it, or together with further guide carriages of a further cross arm on a common guide rail, such a cross arm can be designed circular or only in the form of segments of a circle, wherein its diameter is preferably corresponds approximately to that of the assigned guide rail.

For guiding one turning bar at least two guide carriages are connected with each other by such a cross arm, however, depending on the size and weight, as well as on prevailing space conditions, it is possible to rigidly connect several guide carriages, for example four or six guide carriages, by a common cross arm and they can guide an assigned turning bar.

It is also advantageous if each cross arm contains a gear ring or a gear ring segment, in operative connection with the rotary drive mechanism of the turning bars. If the cross arm is circular, it also preferably contains a circular gear ring while, in a merely gear ring segment-like embodiment, it also contains merely a corresponding gear ring segment, by which a reversing drive can be achieved.

In one embodiment of this invention, for simple and compact design of the turning bar draw-off device, all turning bars are drivable rotatingly or in reverse via a common rotary drive mechanism. Thus it is possible, for example, to provide a common drive motor with several gear stages, wherein each individual gear stage is in operative connection with a gear ring or gear ring segment of the cross arms assigned to the respective turning bars. Not only is the construction of the rotary drive mechanism thereby simplified, the control cost for the operation of the turning bar draw-off device of the invention are reduced, because the desired numbers of revolutions are made available over the common rotary drive mechanism.

As mentioned above, the turning bars can be driven at rotation or reversing speeds which differ from each other. They can also be driven in different directions of rotation independently of each other.

It is one advantage for the desired compact design of the turning bar draw-off device in accordance with the invention, if with the customarily vertically extending axis of rotation of the turning bars, the guide rails are accordingly arranged vertically above each other, so that the respective guide carriages and cross arms remain very compact and therefore require only little space between the guide rails arranged vertically above each other.

Depending on the space conditions and further installation requirements, the guide carriages can be selectively guided and seated above the guide rails or suspended below the guide rails.

In the normal case it is preferred to make the guide carriages and guide rails of wear-resistant materials, for example high quality steel, so that a maintenance-free functioning of the guide carriages and guide rails can be provided over the service life of the turning bar draw-off device. Also, this freedom from maintenance can be increased by designing the guide carriages with a closed lubricant cassette for maintenance-free lubrication with respect to the guide rail.

If an outage of an individual guide carriage should occur, for example because of wear, the guide rails are preferably designed with a removable opening piece in a short partial section of their circular extension, which can be exchanged for a replacement piece equipped with a replacement guide carriage. Thus it is possible in the event of a defect in a guide carriage to provide a simple exchange without the necessity of first disassembling the entire turning bar draw-off device. Thus, first the removable opening piece is removed from the guide rail, and then the defective guide carriage is displaced into the now opened area of the guide rail in which the opening piece had been previously located. Then the guide carriage can be dismounted from the remaining parts of the turning bar draw-off device and at the same time the replacement guide carriage, which is premounted on the replacement piece of the guide rail, can be fastened at this installation spot. Following the fastening of the replacement guide carriage, the replacement piece of the guide rail is placed into the guide rail in place of the removed opening piece, and the original function is restored.

Besides designing the guide rails with an opening piece, which can be removed in a short partial section, it is also preferred to put together the guide rails from several segments of a size which is easy to manipulate and produce.

In a similar manner, it is also possible with the turning bar draw-off device in accordance with this invention for the flattening device for the tubular film, which is customarily located upstream of the turning bar draw-off device and which, in a turning bar draw-off device can be driven rotatingly or in reverse, to be driven rotatingly or in reverse via a rotary drive mechanism with guide carriages and guide rails as described above, because the guide rails of this invention are capable of also dependably supporting the great weight of a flattening device. For this purpose the flattening device is fastened by guide carriages which are driven, suspended from a guide rail, and can also be secured against falling out of this suspended position by catch hooks in order to meet safety requirements.

BRIEF DESCRIPTION OF THE DRAWINGS

Further embodiments and details of this invention are explained in view of an exemplary embodiment shown in the drawings, wherein:

FIG. 5a is a top view on a guide rail equipped with guide carriages;

FIG. 5b is an enlarged representation of detail Y as shown in FIG. 5a;

FIG. 6 represents a sectional view taken along line A-A as shown in FIG. 5b;

FIG. 7 shows a lateral view in a direction indicated by arrow B in FIG. 5b; and

DESCRIPTION OF PREFERRED EMBODIMENTS

Figure 8:
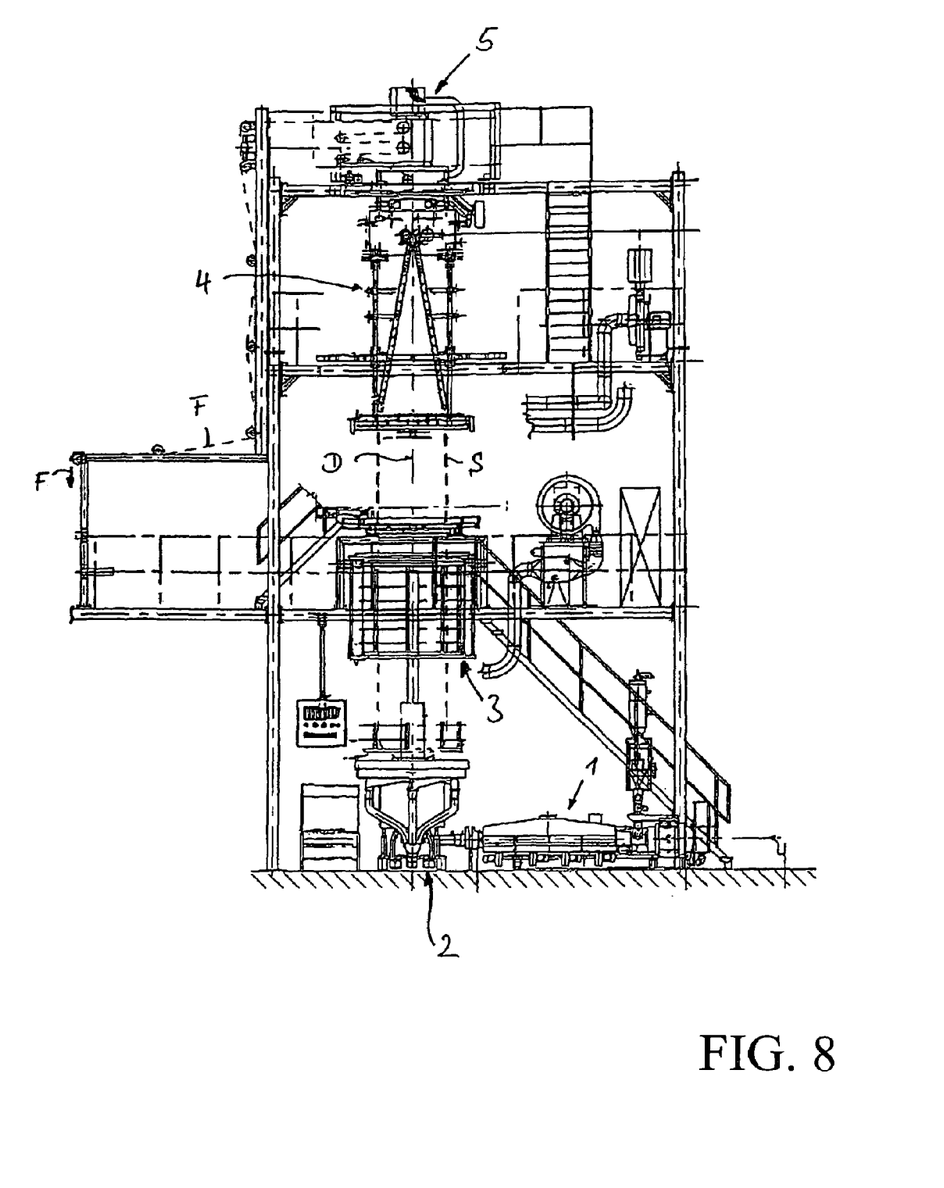
FIG. 8 shows a lateral view of a tubular film extrusion installation with a turning bar draw-off device in accordance with this invention.

The essential components of a tubular film extrusion installation are represented in a lateral view in FIG. 8 and comprise at least one extruder 1 with a downstream-located tubular film extrusion tool 2, from which a tubular film S exits vertically upward and is calibrated to its desired diameter in a calibrating device 3. After passing through the calibrating device 3, the tubular film S reaches a flattening device 4 from where, after passing through a pair of pinch-off rollers, it is transferred as a flattened film web F to a draw-off device 5 in the form of a turning bar draw-off device, and the film web F is thereby conveyed to a subsequent winding device, not shown.

Figure 2:
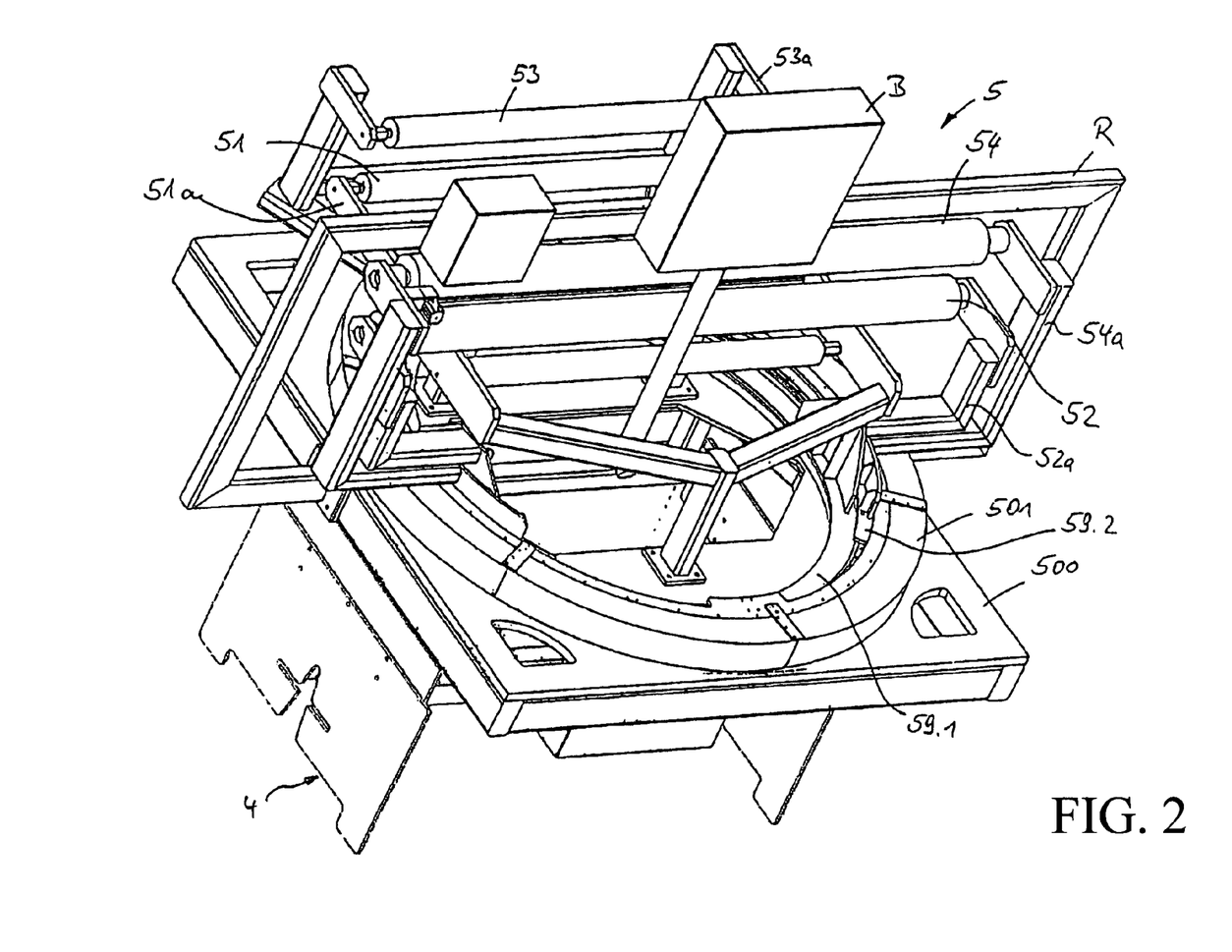
FIG. 2 shows a turning bar draw-off device in accordance with this invention in a concrete embodiment, in a perspective view.
Figure 3:
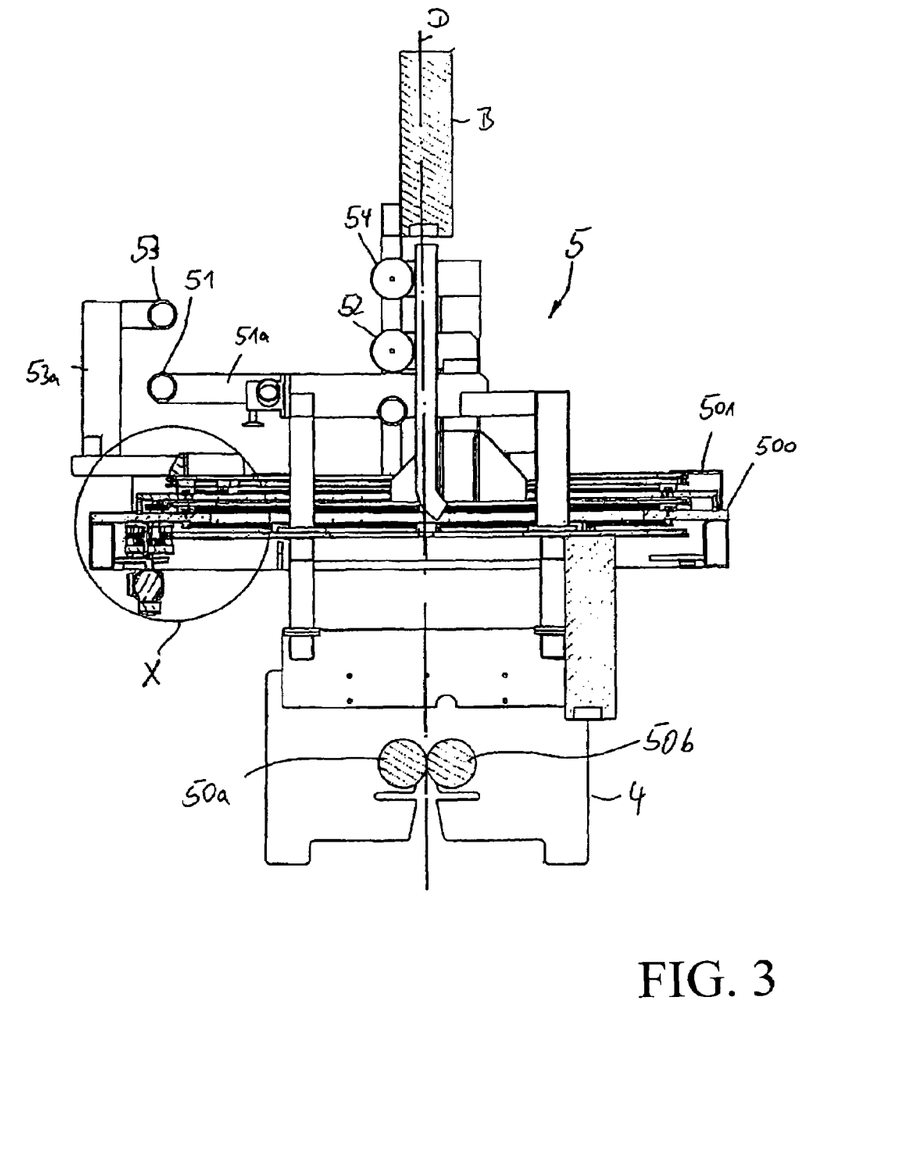
FIG. 3 is a lateral view of the turning bar draw-off device, as shown in FIG. 2.

Further details of the turning bar draw-off device 5 are shown in FIGS. 2 and 3.

As shown in FIGS. 2 and 3, the turning bar draw-off device 5 is arranged above the flattening device 4 with the pair of pinch-off rollers 50a, 50b and consists in a manner known per se of a plurality, here four, turning bars used for guiding the flattened film web, which are identified by the reference numerals 51, 52, 53, 54 in accordance with the sequence of their being looped by the film web. The individual turning bars can be driven rotatingly or in reverse via guide devices, which will be explained in greater detail later, by a rotary drive mechanism around a common axis of rotation D, which corresponds to the axis of the conveyed tubular film S, as shown in FIG. 8, and at different rotating or reversing speeds, in order to cause the distribution, known from the prior art, of thickness tolerances over the entire width of the flattened film web F.

As shown in FIG. 2, in each individual turning bar 51, 52, 53, 54 is rigidly connected via appropriate brackets 51a, 52a, 53a, 54a, which act on the respective ends of the turning bars 51, 52, 53, 54, with correspondingly assigned cross arms 59 of a circular or circular segment shape which, in accordance with their assignment from the first turning bar 51 to the fourth turning bar 54, are identified by reference numerals 59.1, 59.2, 59.3, 59.4.

Figure 4:
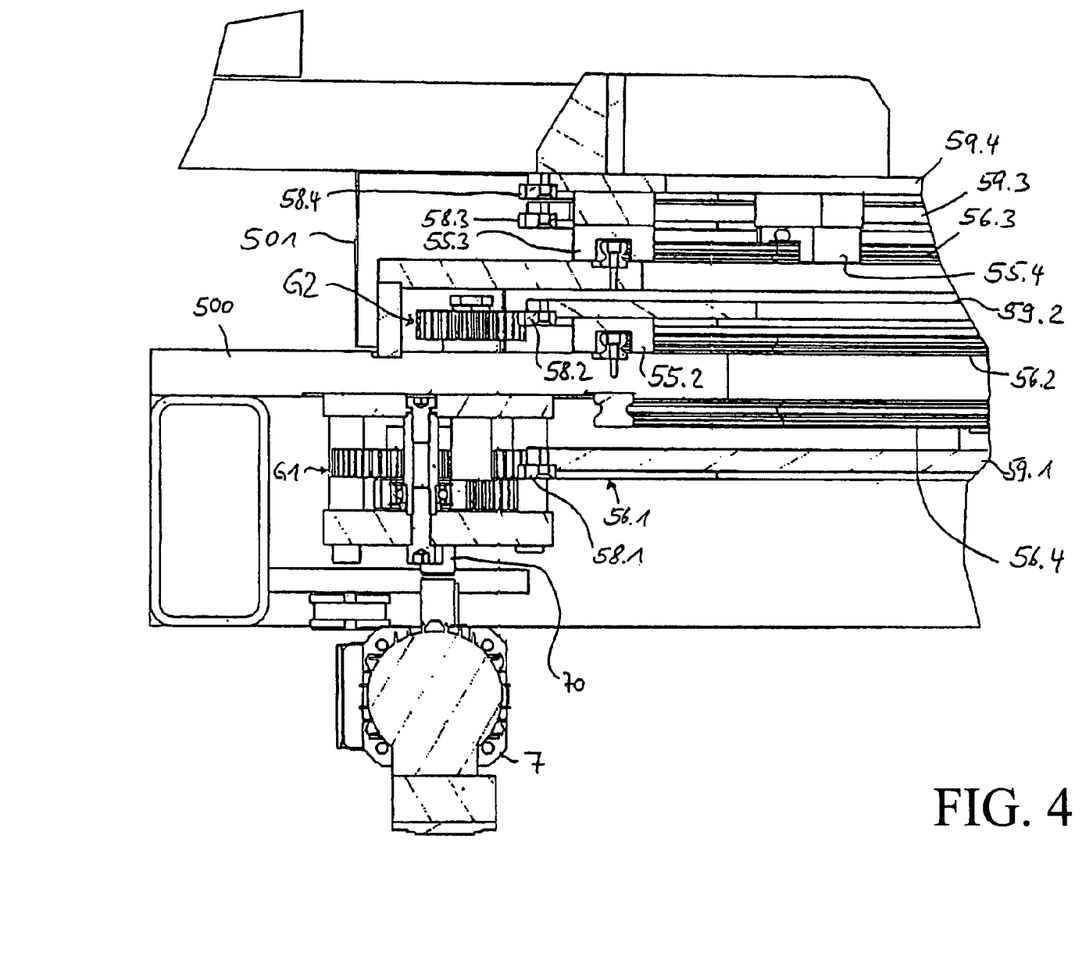
FIG. 4 shows a detail X as shown in FIG. 3 but in an enlarged representation.

The details of the rotary drive mechanism and the guidance of the turning bars 51, 52, 53, 54, which can be driven rotatingly or in reverse around the common axis D, are shown in the enlarged representation in accordance with FIG. 4.

Three circle-shaped guide rails 56 are fastened vertically above each other on a rigid frame 500 of the tubular film extrusion installation, or of the turning bar draw-off device 5, and are identified by the reference numerals 56.1, 56.2, 56.3, on which respective guide carriages 55, identified by the reference numerals 55.1, 55.2, 55.3, 55.3, are displaceably arranged, for example guided along the circle-shaped circumference of the guide rails 56.

For improved understanding, a single guide rail 56 with a total of four guide carriages 55 fastened thereon is shown in greater detail in FIGS. 5a to 7.

The guide rail 56 has a multitude of fastening bores 560, by which it can be fixed in place on the turning bar draw-off device 5. It is embodied with a lateral guide groove 561 along its circle-shaped inner and outer circumference, and the guide carriage 55 guided on the guide rail 56 has a correspondingly embodied undercut sliding groove 550, so that the guidance free of play of the guide carriages 55 on the guide rail 56 is assured.

To provide sufficient permanent operational dependability, each guide carriage 55 is furthermore embodied with a sealed lubricant cassette 552, which can be filled with lubricant through a lubricant nipple 551 for maintenance-free lubrication between the guide carriage 55 and the guide rail 56.

Furthermore, each guide carriage 55 has several fastening bores 554, through which the guide carriage 55 can be fastened to cross arms 59.1, 59.2, 59.3, 59.4, as shown in FIG. 4.

Now the entire arrangement of guide carriages 55, guide rails 56 and cross arms 59 is selected so that respectively one turning bar 51, 52, 53, 54 is rigidly connected with an associated cross arm 59.1, 59.2, 59.3, 59.4 via its respectively assigned brackets 51a, 52a, 53a, 54a. Each one of the previously mentioned cross arms in turn supports a plurality, for example respectively at least two, guide carriages 55.1, 55.2, 55.3, 55.4, which in turn are guided on an associated circle-shaped guide rail 56.1, 56.2, 56.3.

Here, each of the guide rails 56.1 and 56.2 is used for guiding one turning bar, such as the associated cross arm 59.1 or 59.2 only has guide carriages 55.1, 55.2, which are rigidly connected with each other via the cross arm and which are used for guiding a turning bar. In contrast thereto, two groups of guide carriages with their assigned cross arms are arranged together on the guide rail 56.3, namely the guide carriage 55.3 with the cross arm 59.3 and the guide carriage 55.4 with the cross arm 59.4. Accordingly, these are also used for guiding two turning bars, which are thus arranged together with their respectively assigned guide carriages 55.3 or 55.4, on one guide rail 56.3.

With the selected arrangement of the guide rails 56.1, 56.2, 56.3 of one on top of the other, as well as the total of only three guide rails 56.1, 56.2, 56.3 required for the guidance of four turning bars 51, 52, 53, 54, a highly compact arrangement for the guidance of the four turning bars 51, 52, 53, 54 is provided, which are screened toward the exterior by a common cover 501.

Figure 1:
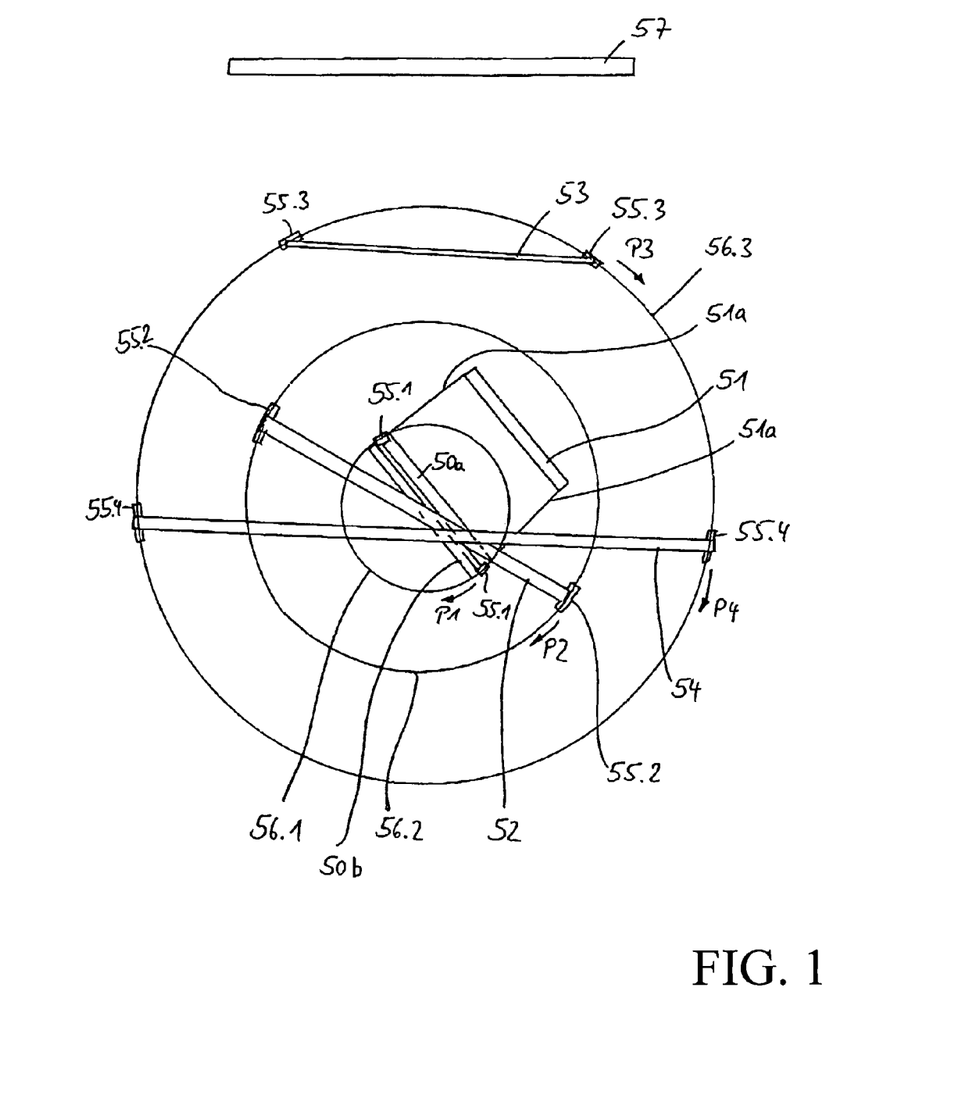
FIG. 1 shows the principle of the turning bar draw-off device in accordance with this invention in a top schematic view.

The previously explained principle of the individual turning bars 51, 42, 53, 54 on only three guide rails 56.1, 56.2, 56.3 arranged in the shape of a circle can also be seen schematically in the top view of FIG. 1, which shows the different turning bars 51, 52, 53, 54 in a snapshot during their operation, while the guide rails 56.1, 56.2, 56.3, which in the actual exemplary embodiment in accordance with FIGS. 2, 3 and 4, are arranged on top of each other and have substantially the same diameter, are differently represented as concentric circles of different diameters for simplifying the presentation.

However, it can be seen in this schematic representation that each turning bar 51, 52, 53, 54 is guided by its respective guide carriage 55.1, 55.2, 55.3, 55.4 on respectively one guide rail 56.1, 56.2, 56.3 assigned to it. In this case the turning bars 53 and 54 are together guided on the guide rail 56.3, while the turning bar 51 is alone guided on the guide rail 56.1 and the turning bar 52 on the guide tail 56.2. In the basic sketch in accordance with FIG. 1 a fixed reversing roller 57 can be seen, over which the flattened film web, which is guided over the turning bars 51, 52, 53, 54, is supplied to the downstream-located winding device.

Figures 5A, 5B, 6, 7:
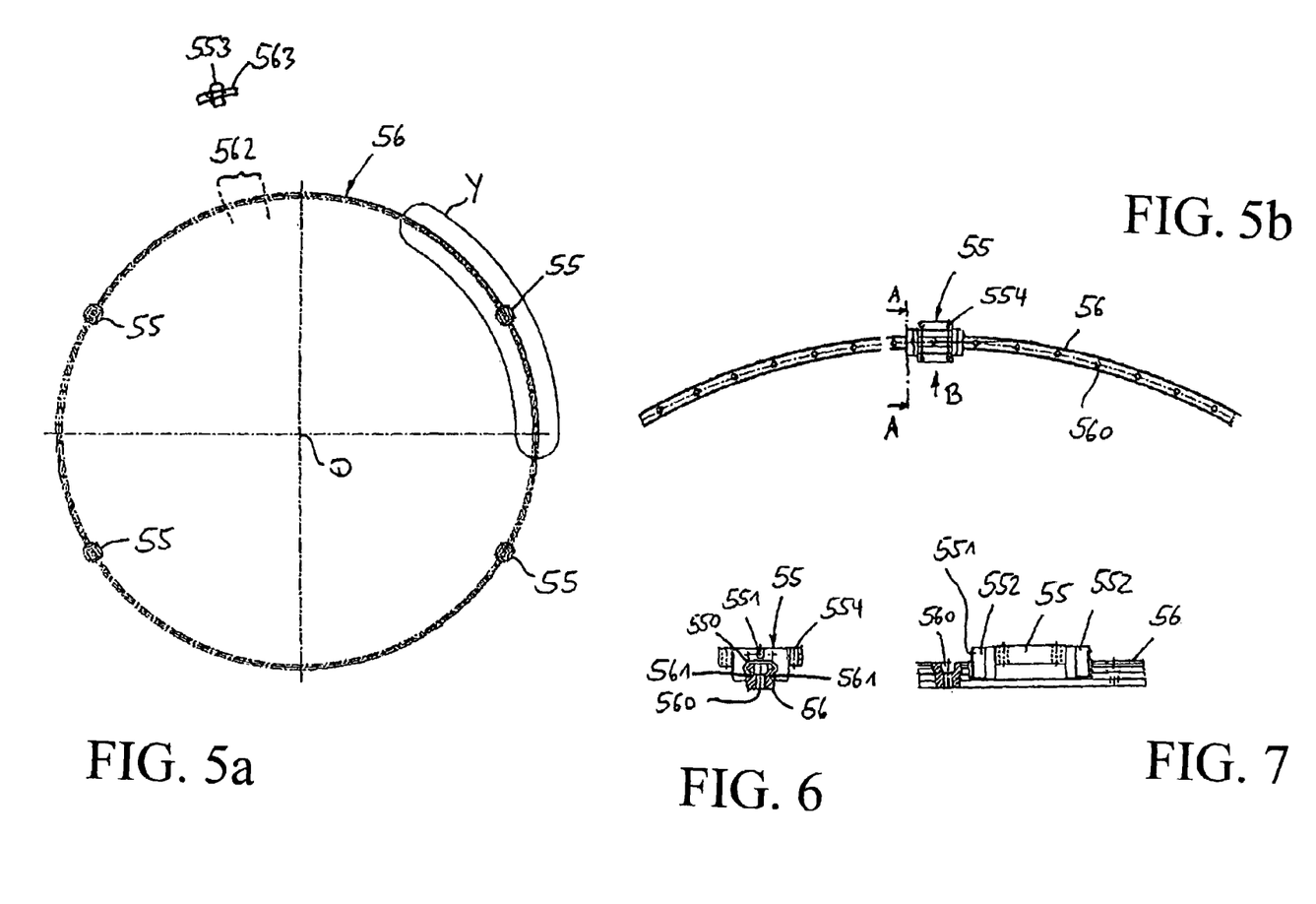

It is understood that for guiding a single turning bar 51, 52, 53, 54 respectively at least two guide carriages 55 on a guide rail 56 are required, however, it is preferred, as shown in FIG. 5a, to rigidly connect at least two, here possibly four or even six guide carriages with a common cross arm 59 and to use them for guiding a single turning bar. In this case the cross arm 59 has an approximately circular shape for matching the guide rail 56.

However, if the turning bar to be guided is only one which merely performs a reversing movement around the axis D of less than 360°, the cross arm can also be designed to be only in the form of a segment of a circle and can rigidly connect at least two guide carriages 55 for the guidance of this turning bar. This is advantageous if several turning bars are guided along a common guide rail 56, for example as shown in FIG. 4, by the guide rail 56.3.

The rotary drive mechanism for the individual turning bars 51, 52, 53, 54 guided on the guide carriages 55 and cross arms 59 along the guide rails 56 for the rotating or reversing movement around the axis of rotation D are shown in detail in FIG. 4.

A central rotatory drive mechanism with a drive motor 7 can be seen, which puts a central drive shaft 70 into rotation. Gear wheels of the desired gearing are centrally driven via several successive gear stages G1 and G2, wherein these gear wheels are in engagement with gear rings, or gear ring segments 58.1, 58.2, 58.3, 58.4 fastened on the outer circumference of the respective cross arms 59.1, 59.2, 59.3, as well as 59.4. In the embodiment shown in FIG. 4, the gear wheel engagement at the gear rings 58.3, 58.4 is not shown for reasons of clarity. However, this central rotatory drive mechanism with the drive motor 7, drive shaft 70 and several gear stages G1, G2, a common central drive of all cross arms, and therefore of the turning bars 51, 52, 53, 54 fastened thereon, with the desired speeds, represented in FIG. 1 by the arrows P1, P2, P3, P4, can be realized. Because these are rigid transmission ratios of a multi-stage gear, the different relative speeds of the individual turning bars 51, 52, 53, 54 are always exactly maintained, and for this reason the structural, as well as the control outlay for the turning bar draw-off device are enormously simplified.

Finally, besides the guide rails 56.1, 56.2, as well as 56.3, already explained above, which are used for guiding the turning bars 51, 52, 53, 54 and can be seen in FIG. 4, a still further guide rail 56.4 is shown which, however, is not used for guiding the turning bars. Instead, the flattening device 4 arranged above the turning bar draw-off device, is fastened on the guide rail 56.4 in a manner analogous to the one described before, and is also seated, rotatable around the common axis of rotation D, by a rotary drive mechanism. In contrast to the guide rails 56.1, 56.2, 56.3, on which the guide carriages 55.1, 55.2, 55.3, 55.4 are conducted seated on the top, here the flattening device is guided on the guide rail 56.4 suspended from its underside by further guide carriages, not represented. Since this guide rail 56.4 is also milled from a solid block, preferably of high quality steel and, as a result of the lateral guide grooves 561, as well as the correspondingly embodied sliding groove 550, of the guide carriage 55 visible in FIG. 6, is positively connected with the latter, the large weight of the flattening device 4 is supported without problems and easy running of the guide carriages along the guide rail 56.4 is also possible. Also, the flattening device 4 can be additionally secured against possibly falling out of the guide rail 56.4 by catch hooks, not shown in detail, in order to meet existing safety regulations.

Although the above explained guide carriages 55 conducted on guide rails 56 are laid out for a service life corresponding to the service life of the entire installation, as shown in FIG. 5a it is possible, in case of damage or the failure of a guide carriage 55, for the guide rail 56 to have a removable opening piece 562 in a short partial section. This opening piece 562 can be removed with tools from the course of the guide rail 56, so that a faulty guide carriage can be moved into this area and releases contact with the guide rail 56. Now the defective guide carriage 56 can be removed without the disassembly of further parts from an assigned cross arm, for example, and a replacement carriage 553 located on a replacement piece 563 corresponding to the opening piece 562 is then fastened at the installation location of the previously removed defective guide carriage 55. The replacement piece 563 bridges the gap in the guide rail 56 caused by the previous removal of the opening piece 562, and a closed circle-shaped guide rail 56 with guide carriages 55 capable of functioning exists.

A considerable simplification of the previously highly complicated drive mechanism, as well as the rotary seating of the individual turning bars, is achieved with the above explained turning bar draw-off device, so that a structure, which can be made particularly compact and cost-effective, is possible, which makes the turning bar draw-off devices which, up to now, had only been used in very pricey tubular film extrusion installations, accessible to a wider field of use.

German Patent References 20 2004 009 242.5 and 20 2004 010 548.9, the priority documents corresponding to this invention, and their teachings are incorporated, by reference, into this specification.

What is claimed is:

1. A turning bar draw-off device for a tubular film extrusion installation, with a plurality of turning bars (51, 52, 53, 54) which can be driven in a rotating direction around a common axis of rotation (D) or in a reverse direction around the axis of rotation by a rotary drive mechanism, the turning bar draw-off device comprising: guiding the turning bars (51, 52, 53, 54) in the rotating direction or the reverse direction around the axis of rotation (D), the ends of each turning bar connected with guide carriages (55), which are guided on guide rails (56) arranged in a circle.

2. The turning bar draw-off device in accordance with claim 1, wherein the guide rails (56) have lateral guide grooves (561) along both a circular inside and a circular outside, and the guide carriages (55) have a correspondingly undercut sliding groove (550).

3. The turning bar draw-off device in accordance with claim 2, wherein the guide carriages (55) have rolling bodies or replacement carriages (553) rolling off onto the guide groove (561) of the guide rails (56).

4. The turning bar draw-off device in accordance with claim 3, wherein the guide carriages (55) of the turning bars (53, 54) are guided on a common guide rail (56).

5. The turning bar draw-off device in accordance with claim 4, wherein the guide carriages (55) assigned to the turning bars (51, 52, 53, 54) are rigidly connected with each other by a cross arm (59).

6. The turning bar draw-off device in accordance with claim 5, wherein the cross arm is either circular or in a form of segments of a circle, and at least two guide carriages (55) are fastened to the cross arm for guiding the respective turning bar (51, 52, 53, 54).

7. The turning bar draw-off device in accordance with claim 6, wherein cross arm (59) contains either a gear ring (58) or a gear ring segment in operative connection with the rotary drive mechanisms of the turning bars (51, 52, 53, 54).

8. The turning bar draw-off device in accordance with claim 7, wherein the turning bars (51, 52, 53, 54) are driven either in the rotating direction or in the reverse direction via a common rotary drive mechanism (7).

9. The turning bar draw-off device in accordance with claim 8, wherein the turning bars (51, 52, 53, 54) are driven at either a rotation speed or a reversing speed which differ from each other.

10. The turning bar draw-off device in accordance with claim 9, wherein the guide rails (56) are arranged vertically above each other.

11. The turning bar draw-off device in accordance with claim 10, wherein the guide carriages (55) are either guided and seated above the guide rails (56) or suspended below the guide rails (56).

12. The turning bar draw-off device in accordance with claim 11, wherein the guide rails (56) have a removable opening piece (562) in a partial section of a circular extension which are exchangeable for a replacement piece (563) having a replacement guide carriage (553).

13. The turning bar draw-off device in accordance with claim 12, wherein the guide carriages (56) have a closed lubricant cassette (552) for maintenance-free lubrication with respect to the guide rail (56).

14. The turning bar draw-off device in accordance with claim 13, wherein the guide rails (56) are assembled from several segments.

15. The turning bar draw-off device in accordance with claim 14, wherein a flattening device (4) is arranged above the turning bar draw-off device (5), which can be driven either in the rotating direction or in the reverse direction by either a rotary drive mechanism, a guide carriage (55) or a guide rail (56).

16. The turning bar draw-off device in accordance with claim 1, wherein the guide carriages (55) have rolling bodies or replacement carriages (553) rolling off onto guide groove (561) of the guide rails (56).

17. The turning bar draw-off device in accordance with claim 1, wherein the guide carriages (55) of the turning bars (53, 54) are guided on a common guide rail (56).

18. The turning bar draw-off device in accordance with claim 1, wherein the guide carriages (55) assigned to the turning bars (51, 52, 53, 54) are rigidly connected with each other by a cross arm (59).

19. The turning bar draw-off device in accordance with claim 18, wherein the cross arm is either circular or in a form of segments of a circle, and at least two guide carriages (55) are fastened to the cross arm for guiding the respective turning bar (51, 52, 53, 54).

20. The turning bar draw-off device in accordance with claim 1, wherein a cross arm (59) contains either a gear ring (58) or a gear ring segment in operative connection with the rotary drive mechanisms of the turning bars (51, 52, 53, 54).

21. The turning bar draw-off device in accordance with claim 1, wherein the turning bars (51, 52, 53, 54) are driven either in the rotating direction or in the reverse direction via a common rotary drive mechanism (7).

22. The turning bar draw-off device in accordance with claim 21, wherein the turning bars (51, 52, 53, 54) are driven at either a rotation speed or a reversing speed which differ from each other.

23. The turning bar draw-off device in accordance with claim 1, wherein the guide rails (56) are arranged vertically above each other.

24. The turning bar draw-off device in accordance with claim 1, wherein the guide carriages (55) are guided and seated above the guide rails (56) or suspended below the guide rails (56).

25. The turning bar draw-off device in accordance with claim 1, wherein the guide rails (56) have a removable opening piece (562) in a partial section of a circular extension which are exchangeable for a replacement piece (563) having a replacement guide carriage (553).

26. The turning bar draw-off device in accordance with claim 1, wherein the guide carriages (56) have a closed lubricant cassette (552) for maintenance-free lubrication with respect to the guide rail (56).

27. The turning bar draw-off device in accordance with claim 1, wherein the guide rails (56) are assembled from several segments.

28. The turning bar draw-off device in accordance with claim 1, wherein a flattening device (4) is arranged above the turning bar draw-off device (5), which can be driven either in the rotating direction or in the reverse direction by either a rotary drive mechanism, a guide carriage (55) or a guide rail (56).

* * * * *